COMMUNICATION SYSTEM

Filed April 2, 1951 2 Sheets-Sheet 1

INVENTOR.
Edward J. Stachura

Jan. 17, 1956 E. J. STACHURA 2,731,600
COMMUNICATION SYSTEM
Filed April 2, 1951 2 Sheets-Sheet 2

INVENTOR.
Edward J. Stachura 2,731,600

COMMUNICATION SYSTEM

Edward J. Stachura, Arlington, Va.

Application April 2, 1951, Serial No. 219,502

4 Claims. (Cl. 332—21)

(Granted under Title 35, U. S. Code (1952), sec. 266)

The invention described herein may be manufactured and used by or for the Government for governmental purposes, without the payment to me of any royalty thereon.

This invention relates to angle modulated systems and more particularly to such systems in which one or more signals are transmitted on the same carrier.

An object of this invention is to provide a radio system which is economical in its frequency spectrum requirements.

Another object of the invention is to provide a communication system for transmitting and receiving on a single main carrier a plurality of separate and independent communications.

A further object of the invention is to provide a novel wave transmission system whereby a subcarrier voltage is used to provide a means for angle modulating the high frequency swings in accordance with one signal to be transmitted, and for angle modulating the lower frequency swings in accordance with a second signal to be transmitted, in a wave transmitting system.

Other and further objects of the invention will be apparent from the following specifications when read in conjunction with the accompanying drawing in which.

Figure 3:
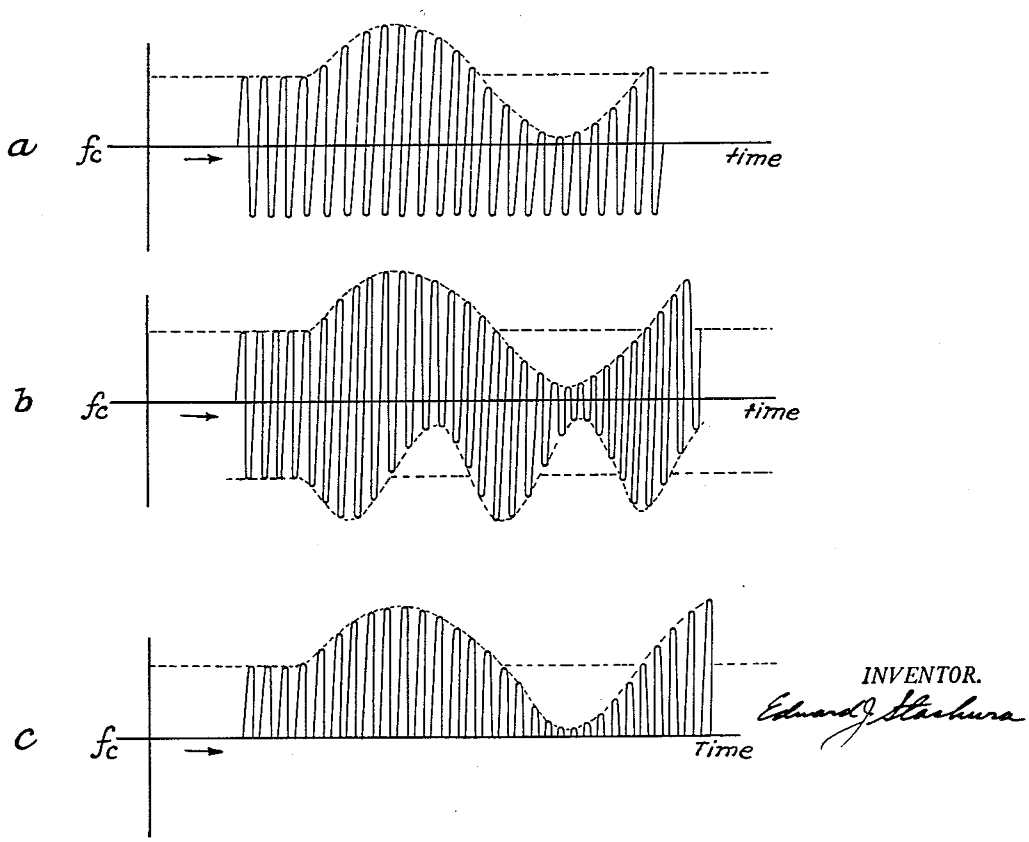
Figure 4:
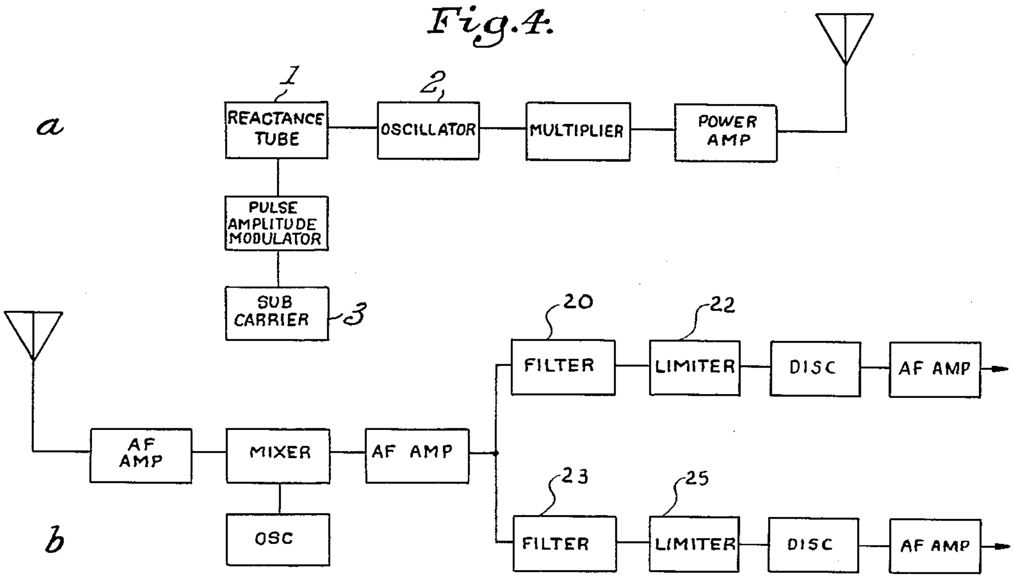
Figure 5:
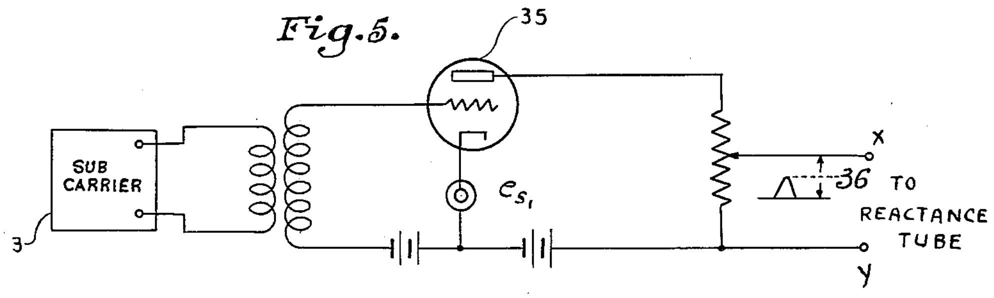
Figure 6:
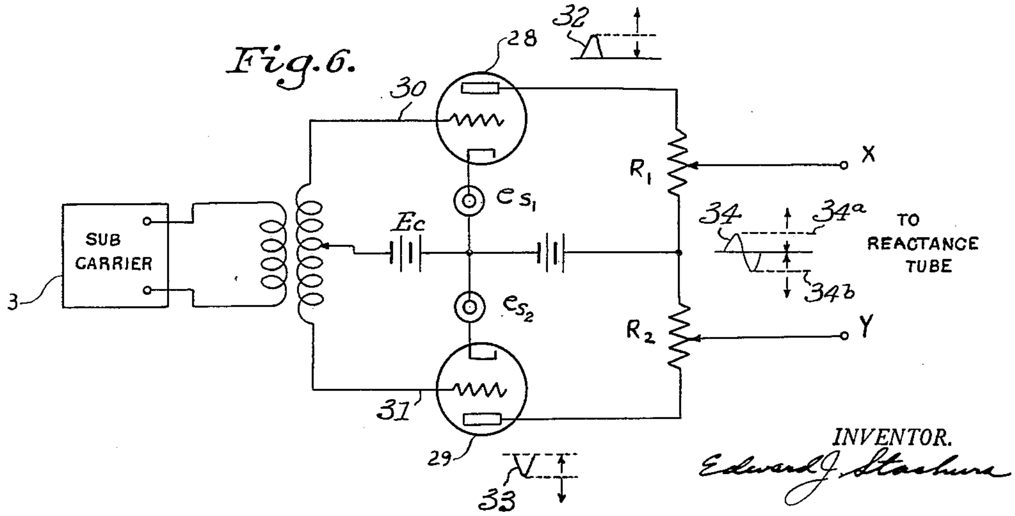

Figures 3*a*, 3*b* and 3*c* are graphs illustrating the features of the invention;

Figure 4 is a diagram of a receiving and transmitting system used in accordance with the invention; and Figures 5 and 6 are schematic diagrams showing a simple pulse amplitude modulator in accordance with the invention.

Briefly, the invention is accomplished by varying the positive swings of a subcarrier frequency modulated carrier in accordance with one signal to be transmitted, and varying the negative swings in accordance with a second signal to be transmitted. Systems for transmitting two or more signals by the modulation of a single carrier are known in the art. These usually employ methods involving the modulation of the main carrier directly with one intelligence to be transmitted and one or more subcarriers each modulated with an intelligence to be transmitted. Each of the carriers and subcarriers may be frequency- or amplitude-modulated as desired. While there are numerous ways in which such multiple transmission may be accomplished, three system utilizing frequency modulation may be found fully disclosed in U. S. Patent No. 2,104,012, issued January 4, 1938, to Armstrong; U. S. Patent No. 2,233,183, issued February 25, 1941, to Roder; and U. S. Patent No. 2,304,969, issued December 15, 1942, to Trevor. In all of the prior art systems wherever subcarriers are employed only one intelligence can be transmitted by one such subcarrier, either by frequency modulation alone, or by amplitude modulation alone. That is, the prior art does not disclose means whereby two angle-modulated signals can be transmitted by the modulation of a single subcarrier wave in the manner accomplished by the present invention.

Figures 1, 2:
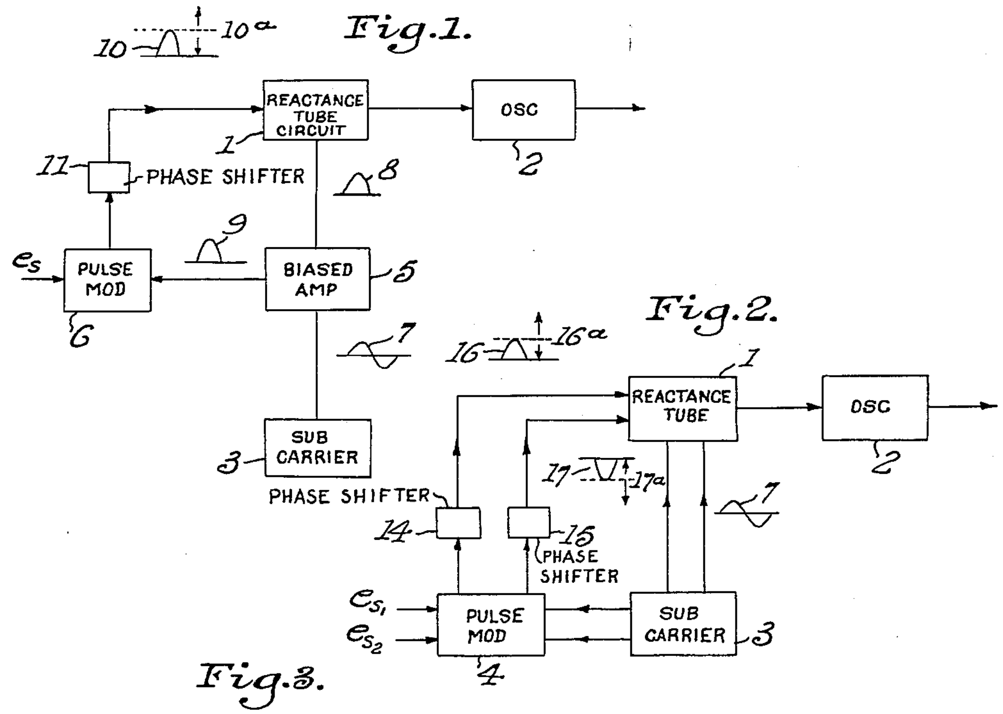
Figure 1 is a diagram of a transmitting system incorporating one embodiment of the invention.
Figure 2 is a diagram of a transmitting system incorporating an embodiment of the invention.

Referring now to Figure 1, 1 represents a reactance tube circuit which may be any one of the many well-known types capable of frequency modulating the radio frequency oscillator 2. A source of energy 3 of a predetermined frequency and amplitude feeds into an amplifier 5. Amplifier 5 may be of the biased type. Pulse 8 in the output of amplifier 5 represents one polarity of input wave 7 and is introduced into the reactance tube circuit for shifting the frequency of oscillator 2 by an amount determined by its instantaneous amplitude and at a rate determined by its period. Pulse 9 represents a second portion of the output of amplifier 5 which is fed into a pulse modulating circuit 6. The action of pulse modulating circuit 6 is perhaps best incorporated as part of a biased amplifier acting as a gating circuit. Such a circuit is shown in Figure 5. Pulse 9, like pulse 8, is normally of a constant amplitude. It will be apparent to those skilled in the art that separate biased amplifiers could be used for performing the functions of blocks 5 and 6 of Figure 1. The action of pulse 9 is to decrease the bias in accordance with its instantaneous value. A source of input signal $e_s$ is also introduced into the input circuit of 6 so that the output of 6, which is represented by pulse 10, will vary in accordance with the signal $e_s$ about the point of normal maximum amplitude $10_a$. A phase shifting network 11 may be utilized to adjust the phase of pulse 10 with respect to pulse 8 so that the desired coaction takes place in the input circuit of the reactance tube circuit 1.

Figure 2 is a modification of the arrangement of Figure 1 for the transmission of two intelligences simultaneously. A source 3 of constant amplitude voltage pulses, having a predetermined frequency, is connected to the reactance tube to produce a subcarrier frequency modulation of oscillator 2. A portion of the subcarrier energy is also fed to a pulse amplitude modulator 4 which may consist of biased amplifiers whose output voltage is introduced into reactance tube 1 where it adds to or subtracts from the input voltage from the subcarrier source 3. The output of the pulse modulator 4 varies in amplitude in accordance with input signals $e_{s1}$ and $e_{s2}$. Input signal $e_{s1}$ produces variations in pulse 16 above and below its normal maximum value 16*a*; while input voltage $e_{s2}$ produces variations in pulse 17 above and below its normal maximum value 17*a*. Pulse 16 is of opposite polarity to that of pulse 17. Phase shifting networks 14 and 15 are used, if considered necessary, to assure that pulses 16 and 17 are introduced into the reactance tube circuit at the proper times relative to the input 7 from the subcarrier source.

The operation of Figure 1 is as follows: Assuming that there is no signal input, that is, $e_s=0$, and that the subcarrier source 3 unblocks the biased amplifier 5 to produce pulses 8 and 9 as indicated, a pulse 10 will be produced in the output of pulse modulator 6 as a result of the gating action of pulse 9. This action will be made clearer later, when the operation of Figure 5 is considered. Thus with $e_s=0$, a pulse 8 at subcarrier frequency is fed into the reactance tube circuit 1, producing a change in reactance to frequency modulate the FM oscillator 2, by a given amount and at a given rate (that of subcarrier frequency). Simultaneously with pulse 8 there is fed into the pulse modulator 6 a pulse 9 which, in one embodiment unblocks a biased amplifier thereby producing a pulse 10, which may be adjusted by means of a phase shifter 11 so that it occurs in phase with pulse 8. Pulses 8 and 10 are then fed into a common part of the reactance modulator so as to produce a reactance change due to their combined effects.

With the application of a signal $e_s$ to, let's say, the grid circuit of the pulse modulator 6, the instantaneous bias point is varied in accordance with the signal $e_s$ to produce a greater or lesser pulse 10 about point 10a in the output. Thus, pulse 10 has a variable "maximum" value which when added to the constant maximum amplitude of pulse 8, affects the instantaneous swing of the oscillator 2 frequency.

It will be apparent to those skilled in the art that the circuit arrangement shown in Figure 1 is capable of producing frequency modulation in a frequency modulated carrier wave through the utilization of a subcarrier signal; and that the frequency and wave shape required of the subcarrier source will depend upon the application of the invention.

In using the system as shown in Figure 1, the amount of frequency deviation representing the signal $e_s$ need not be great, since the subcarrier shift is present at all times. It is well known that narrow band FM signals are not as noise-free as wide band FM signals. In this respect a number of circuits have been developed to reduce attendant effects of low deviation signals, particularly at low values of signal inputs. In one method use was made of a pilot wave having a frequency above or below the signal frequency range, which pilot wave fully modulated the carrier in the absence of signal input, or partially modulated the carrier in the presence of a signal of less than maximum strength, such a system is disclosed, for example, in Curtiss, U. S. Patent No. 2,352,254, granted June 27, 1944.

The present invention incorporates the feature of noise reduction for low values of signal input and, consequently small signal deviations, with positive or negative carrier deviations, or by using both carrier deviations transmitting two signals simultaneously without any interference between them. Such a system makes possible the transmission of voice and telegraphy, sound and facsimile, or any other combinations, as desired. Further, a third signal could be transmitted by also amplitude modulating the carrier.

Figure 3*c* illustrates graphically the variations in the carrier $f_c$ which result from use of the pulse amplitude modulator of the type shown in Figure 5. The modulating voltage feed to the reactance tube in this case is only of one polarity having excursions dependent on the value of signal voltage $e_{s1}$.

Figure 3*b* illustrates the frequency modulated wave which results from the use of the circuit shown in Figure 6. The modulating voltage fed to the reactance tube circuit swings in positive and negative directions at the subcarrier frequency rate. The positive swing varies by amounts determined by the variations in one of the signal voltages $e_{s1}$. The negative swing varies in amounts dependent upon the variations in the other of the signal voltages $e_{s2}$.

Figure 3*a* is similar to Figure 3*b* and illustrates the frequency variations in the carrier when only one signal is applied to the circuits of Figure 6.

Referring now to Figure 4*b* there is illustrated the general diagram of a receiver which may be used in connection with the present invention. The circuit arrangement shown differs from the conventional receivers for angle-modulated signals only in the utilization of two signal output channels, each including a filter, a limiter, a discriminator, and an audio amplifier. Each of the elements shown in Figure 4*b* is well known in the art and, except for the filter, are part of receivers normally used in communication systems. The filters can be of well-known types which are capable of suppressing certain bands of frequencies while passing other bands of frequencies. Thus, in the arrangement shown, filter 20 would be one capable of passing with little loss all frequencies above the carrier frequency while suppressing all frequencies below the carrier frequency; filter 23 would have a characteristic which would pass with little loss all frequencies below the carrier frequency, while suppressing all those above the carrier frequency. One type of filter which would be suitable for this application may be found described in U. S. Patent to Crosby, No. 2,138,341, granted November 29, 1938. The frequency discriminators 22 and 25 are adjusted to operate over the range of frequencies passed by their respective filter.

In Figure 5 is illustrated a circuit arrangement of a simple pulse amplitude modulator capable of operating in accordance with the present invention. Many variations of this circuit will occur to those skilled in the art and the arrangement of Figure 5 is submitted as representative of one type. Tube 35 is normally biased to cut off. The output of the subcarrier source 3 is applied to the input circuit of tube 35. A source of signal $e_{s1}$ to be transmitted is also introduced into the grid circuit of tube 35. With $e_s=0$, the voltage between $x—y$ will be of an amplitude 36. As $e_{s1}$ is applied the maximum normal amplitude of 36 will vary above and below 36 in accordance with $e_{s1}$ variations.

It will be apparent to those skilled in the art that while the embodiment of the invention described herein disclosed the use of a reactance tube FM modulator circuit, that the invention can be carried out in conjunction with the phase-frequency type of FM modulating circuit of the type described by Armstrong in the Proceedings of the IRE, vol. 24, p. 689, May 1936, as well as others, forms may be used where desired without departure from the spirit of the invention.

Figure 6 illustrates a basic circuit arrangement which may be used as a pulse amplitude modulator in accordance with the present invention. Tubes 28 and 29 are connected in a push-pull balanced arrangement and biased by means of $E_c$ to cut-off value. That is, with no subcarrier signal applied, no plate current flows. However, with subcarrier excitation applied to the grids, and under the condition that signal voltages $e_{s1}$ and $e_{s2}$ are zero, a pulse of plate current will be produced in the plate circuit of a tube each time its respective grid is swung positive. It will be apparent, therefore, that with a voltage applied to the grids by source 3, an alternating voltage will be developed across $R_1$ and $R_2$ so that it appears between points X and Y. The voltage at $x—y$ will be at the subcarrier frequency. A signal voltage $e_{s1}$ applied between grid 30 and the cathode of tube 28 will produce variations in the amplitude of plate I pulse 32, and if $e_{s2}$ is zero, the voltage appearing between points $x$ and $y$ will be unsymmetrical since the swing in one direction will be greater, or smaller, than the swing in the other direction. Similarly, if $e_{s1}$ is zero and a signal is applied at $e_{s2}$, the plate current pulse 33 will vary in amplitude and produce dissymmetry in a direction opposite to that which existed when $e_{s1}$ was applied and $e_{s2}$ was zero. If, therefore, points $x—y$ were connected to a reactance tube, the voltage appearing thereacross could be used to frequency modulate an oscillator in accordance with the invention. That is, by varying the positive amplitudes of a subcarrier in accordance with one signal, and the negative amplitudes of a subcarrier in accordance with a second signal, a carrier could be simultaneously modulated with two separate intelligences. With two separate signals in the form of $e_{s1}$ and $e_{s2}$ applied simultaneously, the voltage at $x—y$ 34 will be at the subcarrier frequency, having its positive alternation varying about 34a in accordance with $e_{s1}$ variation, and its negative alternation varying in accordance with $e_{s2}$ variations.

While I have shown and particularly described certain embodiments of my invention, it is to be understood that the invention is not limited thereto but only by the scope of the appended claims.

What I claim is:

1. A transmitter for a multiplex signalling system comprising a plurality of sources of signalling currents, means for generating a carrier wave of the frequency to be transmitted, a source of subcarrier frequency waves having a predetermined amplitude, means for frequency modulating said carrier wave at the subcarrier frequency for producing a no-signal positive and negative frequency shifts in said carrier by an amount determined by said amplitude, means responsive to said source of subcarrier frequency for varying the carrier frequency about said no-signal positive shift in accordance with one of said signalling currents, and means responsive to said source of subcarrier frequency for varying the carrier frequency about said no-signal negative shift in accordance with another of said signalling currents, thereby modulating said carrier with two signals utilizing but one subcarrier wave.

2. In combination with a frequency modulation wave signal transmitting system which includes a source of carrier signals and means for varying the frequency of said carrier signals, means comprising a source of subcarrier signals, said subcarrier signals having a predetermined frequency and a normal amplitude, means responsive to said subcarrier signals including means for producing pulses in synchronism therewith, said pulses having a normal maximum amplitude, a source of intelligence bearing signals connected to said means responsive, said intelligence bearing signals causing a variation in the amplitude of said pulses above and below said normally maximum amplitude in accordance with said intelligence, and means for combining said pulses with a portion of the output of said subcarrier and feeding said combined pulses into said means for varying, to produce variations in said carrier wave signals.

3. A transmitter for transmitting a plurality of frequency modulated signals comprising; means for generating a carrier wave signal; a source of subcarrier wave signals; means for frequency modulating said carrier wave at the subcarrier frequency for producing a positive and negative frequency swing in said carrier wave by an amount determined by the subcarrier wave amplitudes; a first and second signalling voltage; means for varying the amplitude of the positive amplitude of said subcarrier wave in accordance with said first signalling voltage, and means for varying the negative amplitude of said subcarrier wave in accordance with said second signalling voltage.

4. A transmitter for transmitting at least two angle modulated signals comprising; a source of carrier wave energy; a source of subcarrier wave energy; means for frequency modulating said carrier wave at said subcarrier frequency for producing positive swings in the carrier wave frequency by an amount determined by the subcarrier wave no-signal maximum amplitude during one half cycle, and negative swings in the carrier wave frequency by an amount determined by the subcarrier wave no-signal maximum amplitude during its other half cycle; a first signal to be transmitted, means responsive to said first signal for varying the amplitude of said subcarrier about its no-signal maximum amplitude during said one half cycle; a second signal to be transmitted, and means responsive to said second signal for varying the amplitude of said subcarrier about its no-signal maximum amplitude during said other half cycle.

References Cited in the file of this patent

UNITED STATES PATENTS

| | | |
|---|---|---|
| 1,906,269 | Hough | May 2, 1933 |
| 2,103,847 | Hansell | Dec. 28, 1937 |
| 2,171,151 | Urtel | Aug. 29, 1939 |
| 2,262,764 | Hull | Nov. 18, 1941 |
| 2,279,659 | Crosby | Apr. 14, 1942 |
| 2,451,430 | Barone | Oct. 12, 1948 |